F. KILCHER.
TIRE PROTECTOR FOR AUTOMOBILE AND OTHER WHEELS.
APPLICATION FILED DEC. 26, 1911.

1,051,813.

Patented Jan. 28, 1913.

Witnesses:

Inventor
Fridolin Kilcher
By
Attorney.

UNITED STATES PATENT OFFICE.

FRIDOLIN KILCHER, OF BIRSFELDEN, SWITZERLAND.

TIRE-PROTECTOR FOR AUTOMOBILE AND OTHER WHEELS.

1,051,813. Specification of Letters Patent. Patented Jan. 28, 1913.

Application filed December 26, 1911. Serial No. 667,726.

*To all whom it may concern:*

Be it known that I, FRIDOLIN KILCHER, a citizen of the Swiss Republic, and resident of Birsfelden, Switzerland, have invented certain new and useful Improvements in Tire-Protectors for Automobile and other Wheels, of which the following is a specification.

It is a well known fact that the economical efficiency of the vehicles provided with pneumatic tires is highly biased because of the great wear and tear of said expensive tires. Many attempts have been made to remedy the above drawback, viz. by changing the air chamber or by reinforcing the tire cover. The fact that said improvements had no success proves their not being adequate.

The present invention has for its object to provide a device which not only secures the highest protection against wear and damage, but reduces also to a minimum the whirling clouds of dust raised while running on dusty roads, thus eliminating a serious inconvenience.

The device may be applied readily to every wheel, whatever may be the class of vehicle. It comprises a supple endless belt which smoothly applies itself on to the ground in front of the wheel and is guided back over said wheel. The belt forms a track on which the wheel runs and secures an efficient protection against skidding in the strong curves. Furthermore the friction of the tire is reduced to a minimum, causing a very moderate heating of the air chamber, thereby avoiding its bursting.

Figure 1:
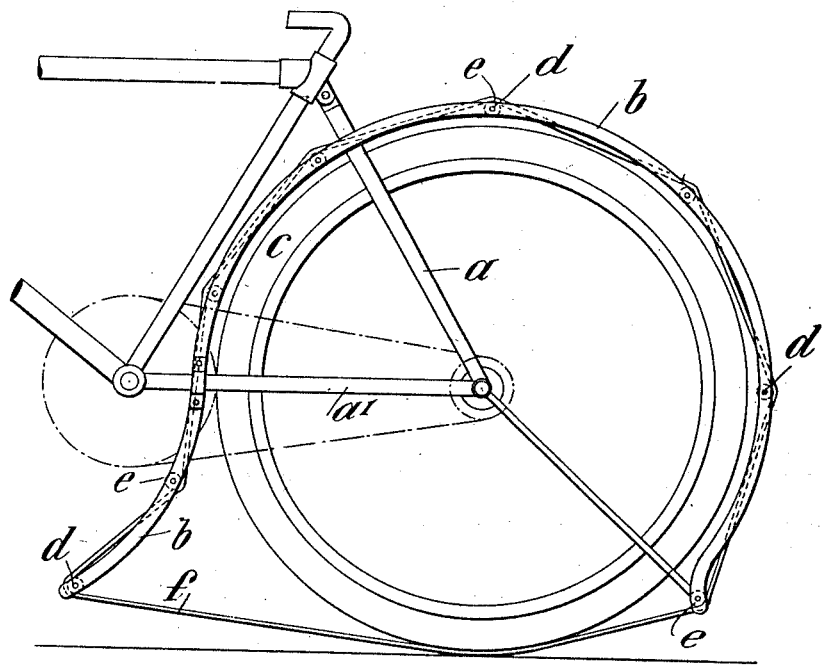
Figure 2:
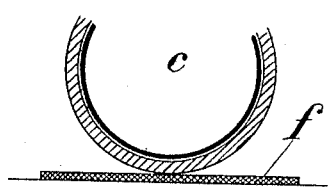
Figure 3:
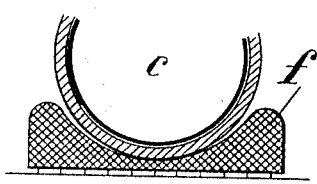

The arrangement is shown in the accompanying drawing, in which:

Figure 1 shows the device applied to the rear wheel of a bicycle. Fig. 2 is a cross-section of the belt and of a part of the tire. Fig. 3 is a cross-section of a somewhat different form of belt and of part of the tire.

On the stay tubes $a$, $a'$, of the frame are riveted two parallel curved guiding pieces $b$ made of flat iron. Said guides $b$ are concentrically disposed with respect to the wheel, their inner diameter being somewhat larger than the outer diameter of the wheel tire $c$. The outwardly curved front ends of said arc shaped guides nearly reach the ground and extend far ahead. The rear ends are at the same level as the front ends and somewhat curved rearward. The guides $b$ are connected by means of stay bolts $d$ and the distance between said guides is somewhat greater than the width of the belt $f$. The bolts $d$ carry rotating rollers $e$ upon which the supple belt $f$ made of leather, Bolata or any other suitable material runs while it is maintained on the other hand between the guides $b$. From the rollers $e$ which are mounted at the ends of the guides $b$ the belt $f$ passes toward and underneath the wheel, thus forming a track for said wheel.

As shown by Figs. 2 and 3, the profile of the belt may be rectangular as well as plano-convex. This last shape secures the wheel against side-slipping, the wheel readily running inside the provided groove. While running, the belt, through the action of the wheel, applies itself on the ground, thus forming a track for the wheel. As the belt is longer than the periphery of the wheel, it cannot happen that injured parts of the belt $f$ pass always over the same places of the wheel tire $c$, thus increasing highly the protection of said tire. The belt $f$ may be perfectly stretched or loose. The motion may be best transmitted to said belt by means of the wheel as in the example described and shown in the drawing. Of course the rollers $e$ may be provided with ball bearings, for reducing the friction to a minimum.

Having now fully described my said invention, what I claim and desire to secure by Letters Patent, is:

1. In combination a wheel including a tire, a tire protector comprising a pair of parallel arc shaped strips concentrically disposed with respect to the wheel and surrounding the upper portion thereof, the diameter of said arc shaped strip being somewhat greater than the outer diameter of the tire to form a space between the strips and the wheel, the opposite ends of the strips being outwardly curved, the front curved ends of the strips being extended far ahead from the wheel and near the ground, bolts connecting both said arc shaped strips, guide rollers loosely mounted on said bolts between both said strips, an endless belt passing alternately over and under said rollers and between the strips and under the wheel.

2. In combination, a wheel including a tire, a tire protector comprising a pair of parallel arc shaped strips concentrically disposed with respect to the wheel and surrounding the upper portion of the latter, the diameter of said arc shaped strips being somewhat greater than the outer diameter of the tire to form a space between the tire and the tire protector, and the ends of said strips being oppositely curved, the front curved ends of the strips extending far in advance of the wheel and terminating near the surface over which the wheel travels, stay bolts connecting both said arc shaped strips, guide rollers loosely mounted on said bolts between said strips, an endless belt passing around said rollers and between the strips and under the wheel, said belt being flat on its outer surface and concave on its inner surface, the tread surface of the wheel falling in the concave portion of the belt.

In testimony whereof I have hereunto set my hand in presence of two witnesses.

FRIDOLIN KILCHER.

Witnesses:
JOSEF WISER,
ARNOLD ZUBER.